United States Patent [19]

Arrowood et al.

[11] Patent Number: 5,077,730
[45] Date of Patent: Dec. 31, 1991

[54] METHOD OF AUDITING PRIMARY AND SECONDARY NODE COMMUNICATION SESSIONS

[76] Inventors: Andrew H. Arrowood, 7627 Trowbridge Ct., Raleigh, N.C. 27613; Kaiwah Chan, 110 Bellacree Rd., Duluth, Ga. 30136; Owen H. Choi, 305 Key Ct., Raleigh, N.C. 27614; John G. Dudley, 6113 Gainsborough Dr., Raleigh, N.C. 27612; Diane A. Schuster, 2429 Trinity Farms Rd., Raleigh, N.C. 27607

[21] Appl. No.: 561,625

[22] Filed: Aug. 2, 1990

[51] Int. Cl.$^5$ .......................... H04J 1/16; G06F 11/00
[52] U.S. Cl. ...................................... 370/16; 371/11.2
[58] Field of Search .......................... 370/16, 94.1, 60; 340/825.01, 827, 825.03; 371/11.1, 11.2, 11.3

[56] References Cited

U.S. PATENT DOCUMENTS

| | | | |
|---|---|---|---|
| 4,482,999 | 11/1984 | Janson et al. | 370/94.1 |
| 4,677,588 | 6/1987 | Benjamin et al. | 364/900 |
| 4,748,620 | 5/1988 | Adelmann et al. | 370/94.1 |
| 4,884,263 | 11/1989 | Suzuki | 370/16 |
| 4,975,914 | 12/1990 | Ashton et al. | 371/11.2 |

OTHER PUBLICATIONS

"Systems Network Architecture-Technical Overview", Ch. 4, Publication GC30-3073; 1986, IBM.

Primary Examiner—Benedict V. Safourek
Assistant Examiner—H. Kizou
Attorney, Agent, or Firm—Jerry W. Herndon

[57] ABSTRACT

A method and apparatus of releasing resources allocated to terminated sessions at a secondary data processing node. A first node transmits one or more switch messages to a second node requesting the second node to redistribute sessions on a first route between the nodes among one or more alternate routes. Each switch message identifies the sessions to be switched and an alternate route to which the sessions are to be switched. The last switch message transmitted by the first node is indicated to be the last message in some appropriate way and includes a count of the total number of sessions that have been requested to be switched. The second node accumulates a count of the total number of sessions on the first route for which it has received a switch request. The second node compares its accumulated count with the total count derived from the last switch message and releases the resources allocated to all remaining sessions on the first route in the event the counts are equal.

10 Claims, 5 Drawing Sheets

FIG. 6

| ROUTE NO. | PSSC | LOOPCTR | | LINK TO 1ST SESSION |
|---|---|---|---|---|

FIG. 7

| FAILED ROUTE | ALTERNATE ROUTE | SESSION 1 ID | | SESSION X ID | CURCNT | FINCNT |
|---|---|---|---|---|---|---|

FIG. 8

| ROUTE NO. | SSSC | RCVFIN | |
|---|---|---|---|

METHOD OF AUDITING PRIMARY AND SECONDARY NODE COMMUNICATION SESSIONS

TECHNICAL FIELD

The invention relates to data communication and networking systems, in general, and particularly to the timely release of resources, such as buffers, etc., at system nodes involved in a communication session under abnormal conditions, such as route failure.

BACKGROUND OF THE INVENTION

Some types of data communication systems use the concept of primary and secondary nodes or logical units (LUs) to control data communications on sessions between the nodes. The System Network Architecture (SNA), for example, provides for such a relationship with respect to LUs, as described in the publication "Systems Network Architecture—Technical Overview"; Publication GC30-3073; 1986; International Business Machines Corporation. In the SNA environment, a primary LU is responsible for initiating the establishment of sessions to a secondary LU via one or more routes. A route between primary and secondary nodes may encompass intermediate nodes and a route may contain many sessions. A session is a logical communication connection between logical units (LUs). A LU as defined in SNA is a network addressable logical entity through which a user or application can gain access via a network to another LU on a different node for services.

The prior art, as described in the above-mentioned publication GC30-3073, includes the ability to provide a backup session for an active session between primary and secondary LUs. This ability is called Extended Recovery Facility (XRF). The backup session remains idle while the active session is operational. If failure of the active session is detected, the backup session is automatically substituted for the active session by a SWITCH message sent from the primary LU to the secondary LU?, thus allowing uninterrupted operation between the primary and secondary LUs. This prior art, implemented by software, is analogous to other known art that provides backup communications channels for active channels. For example, it is known to automatically substitute by means of hardware a backup channel for an active channel upon detection of a channel failure.

In the SNA architecture, it is also known to switch sessions to alternate routes upon detection of a route failure. U.S. patent application Ser. No. 301,193, NONDISRUPTIVE SESSION RECOVERY, filed by Aston et al, discloses such a method using messages analogous to switch commands.

When a primary node wishes to terminate a session, it transmits a message to that effect to the secondary node and the secondary node responds with appropriate action, such as deallocating buffers assigned to the session and updating its internal memory. However, during abnormal conditions, it is possible for a primary node to terminate a session and for notification of the termination to fail to reach the secondary node. One such situation can occur when a termination message from the primary fails to get through to the secondary because of a route failure. The result can be that the primary node believes that both nodes are aware of the termination, whereas the secondary believes that the session is still active. No doubt there are other abnormal situations in which similar out-of-step conditions between primary and secondary nodes can occur. In such cases, the secondary node unnecessarily retains resources, such as buffers, for the session until a timeout occurs either on session communication or failure to receive a session switch message after the secondary node becomes aware of a route failure. Despite careful attention to avoid such situations in which the primary and secondary nodes can get out-of-step, it is never possible to guarantee it.

When a primary node wishes to reassign existing sessions to alternate routes, such as it might do in the case of a route failure, it generates switch messages which are sent to the secondary via the alternate route(s) to be used for the sessions. A switch message informs the secondary that the primary node is reassigning one or more existing sessions to a route different from that on which the session is presently assigned. In the problem areas addressed by the invention, the primary node never sends any switch message(s) for whatever reason, thus causing the secondary to maintain unnecessarily the session resources until a timeout occurs for the session(s) in question.

SUMMARY OF THE INVENTION

The invention avoids this problem and frees resources allocated to sessions at a node faster than possible with only the use of timeouts. A first node transmits one or more switch messages to a second node requesting the second node to redistribute the sessions on a first route between the nodes among one or more alternate routes. Each switch message identifies the sessions to be switched and an alternate route to which the sessions are to be switched. The last switch message transmitted by the first node is indicated to be the last message in some appropriate way. A representation of the total number of sessions that have been requested to be switched is included in the last message. The second node accumulates a count of the total number of sessions on the first route for which it has received a switch request. The second node compares its accumulated count with the total count derived from the last switch message and releases the resources allocated to all remaining sessions on the first route in the event the counts are equal.

In a preferred embodiment, each switch message is transmitted to the second node via the alternate route intended for the sessions identified in the switch message. An indication is set in the last message that it is the last message. The count contained in a switch message indicated to be last is saved to accommodate the case in which switch messages may arrive at the second node in an order different from the order in which they were sent. If the count in the message indicated to be last does not equal the accumulated count at the second node, the second node continues to accumulate a total count of the number of sessions required to be switched in response to subsequent switch messages received after the message indicated to be last. The resources allocated to any remaining sessions on the first route are released whenever the counts become equal or in response to the expiration of a timer irrespective of the number of sessions switched as a result of switch messages.

DESCRIPTION OF THE DRAWING

In the drawing,

FIGS. 6 through 8 show illustrative formats of data structures at the first and second nodes and of switch messages.

DETAILED DESCRIPTION

Figure 1:
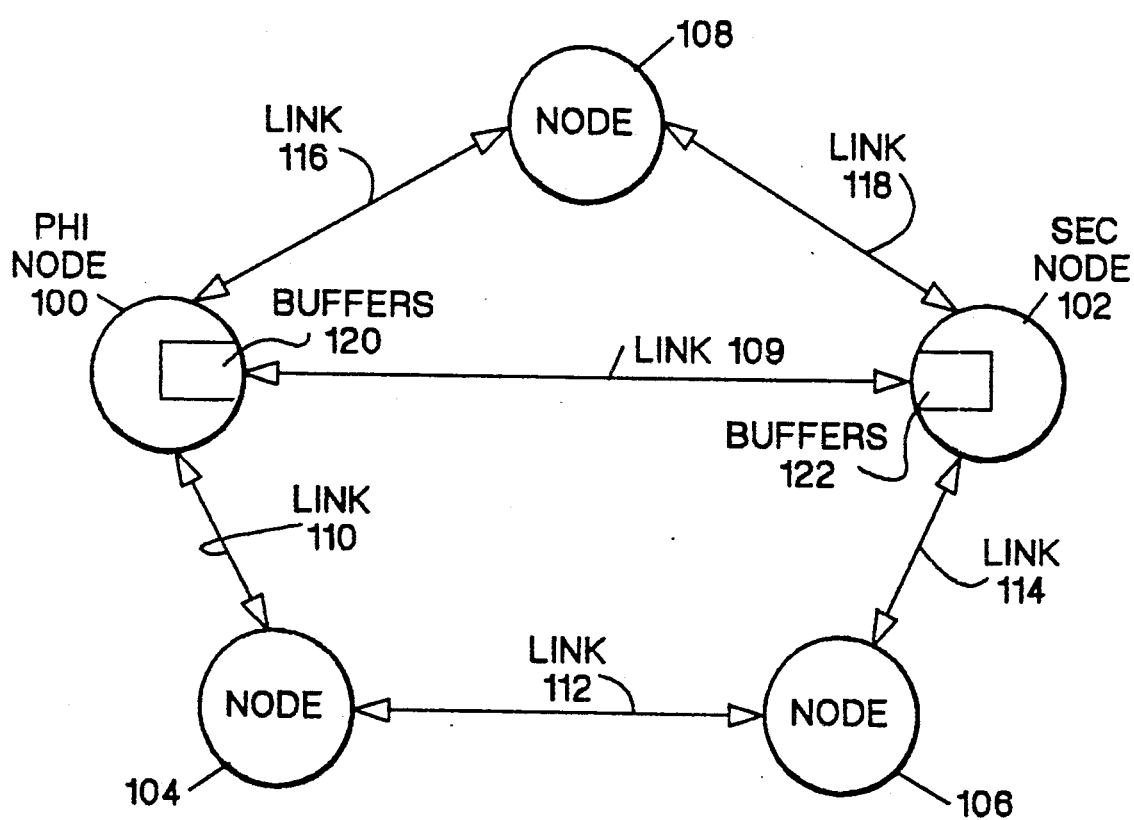
FIG. 1 shows an illustrative telecommunications network including a plurality of data processing nodes and communications links connecting the nodes forming communication routes and alternate routes.

FIG. 1 shows a general layout of an illustrative data communication system in which the invention may be practiced. This illustrative system includes a number of data processing nodes 100, 102, 104, 106 and 108. Each node contains a computer or data processing unit and appropriate peripheral units for communicating with other nodes of the system under control of the computer. A computer at a node may be any type of general or special purpose computer capable of being programmed in accordance with the principles disclosed herein. In the preferred embodiment contemplated by the inventors, such computers include the 3090 and 9370 computers marketed by the IBM Company. By way of example, it is assumed that a physical communications link 109 exists between nodes 100 and 102 and that there are a number of sessions active on this link. It is further assumed that node 100 is the primary node and that node 102 is the secondary node. Because there are no intervening nodes between primary node 100 and secondary node 102 via link 109, then link 109 is also equivalent to a route in SNA terminology and the terms link and route will be used interchangeably herein with respect to 109. In accordance with conventional practice, both primary and secondary nodes have allocated a set of resources including buffers 120 and 122, respectively, for the sessions. Also in accordance with conventional practice, nodes 100 and 102 are alerted if route 109 experiences a failure. In such a case, node 100 may elect to terminate some sessions and to switch other sessions on route 109 to other routes between the nodes. Two such alternate routes are shown in FIG. 1. One consists of links 110, 112, 114 and intermediate nodes 104 and 106. The second alternate route consists of links 116, 118 and intermediate node 108. Node 100 may reassign the sessions on the failed route between the alternate routes and inform the secondary node of the reassignments by switch messages transmitted to the secondary node 102 via the respective alternate routes. Under the abnormal conditions addressed by the invention, it is assumed that the primary and secondary nodes become out-of-step; that is, it is assumed that the primary node terminates some sessions on route 109 and releases its resources 120 allocated to the terminated sessions, while the secondary erroneously remains uninformed of the terminations and maintains its resources allocated to the terminated sessions.

Figure 2:
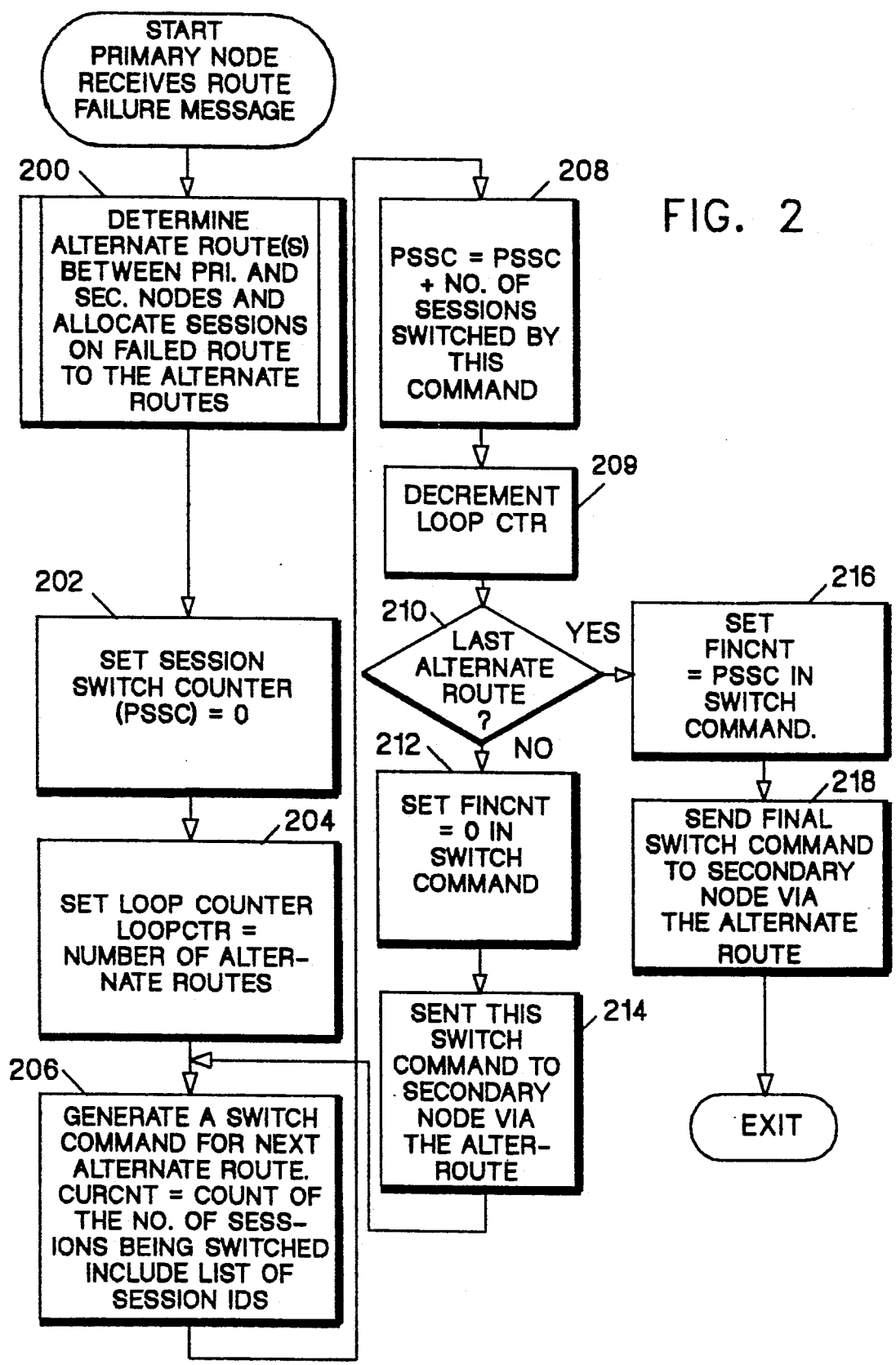
FIG. 2 shows illustrative steps executed by a computer at a first node to generate switch messages to redistribute sessions on a first route between the first and a second node to one or more alternate routes.
Figure 3:
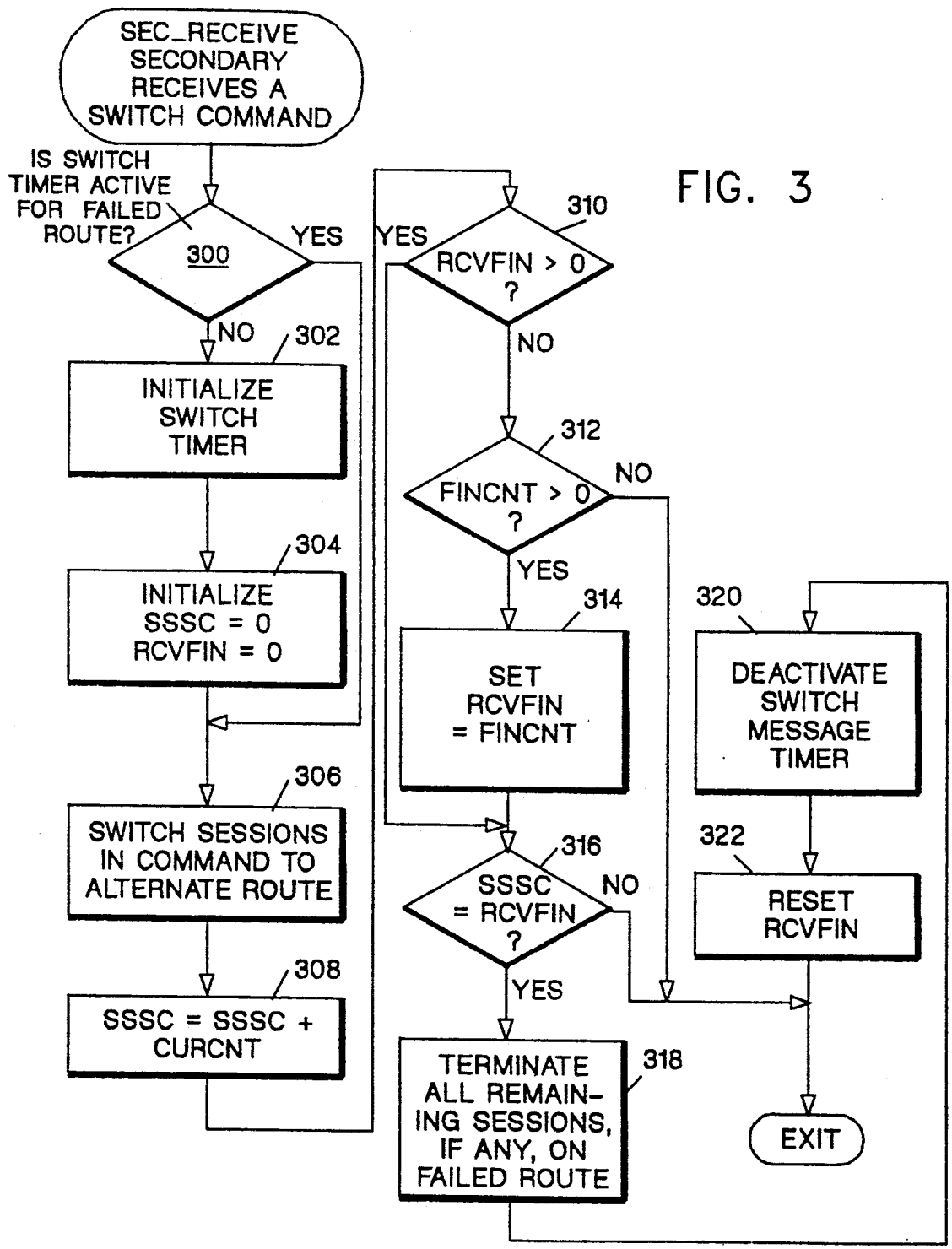
FIG. 3 shows illustrative steps executed at the second node in response to switch messages from the first node.
Figure 4:
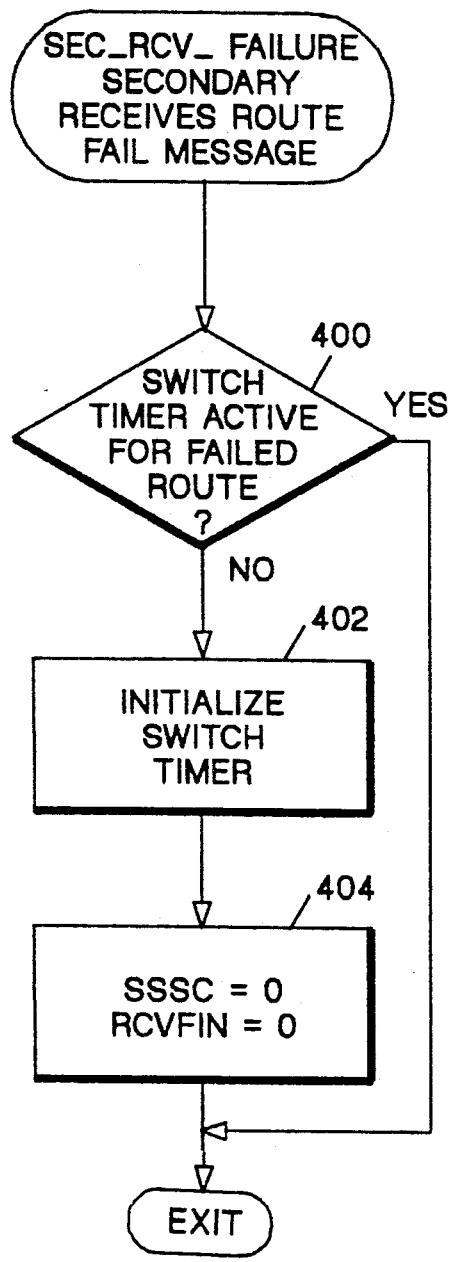
FIG. 4 shows illustrative steps executed by the computer at the second node to activate a timer in response to an alert of a route failure.
Figure 5:
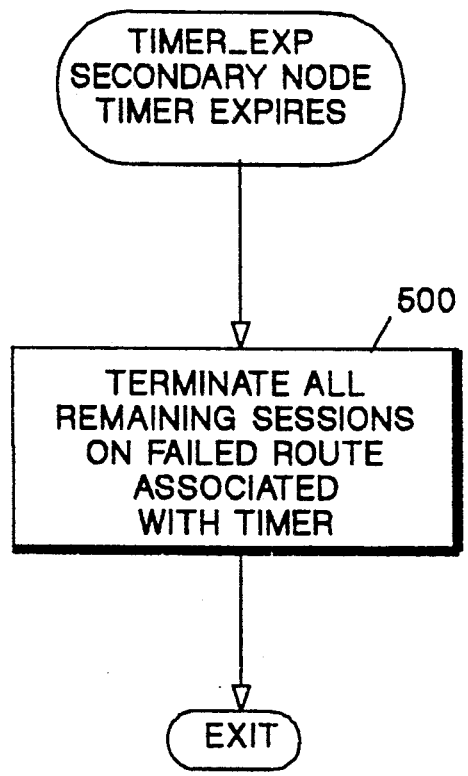
FIG. 5 shows illustrative steps executed by the computer at the second node to release resources in response to expiration of the timer, irrespective of the receipt of switch messages.

FIG. 2 shows the method steps executed by the primary node 100 in response to a route failure alert to quickly solve the problem should the primary and secondary nodes get out-of-step. FIG. 3, 4 and 5 show method steps executed by the secondary node to accomplish the same goal.

In FIG. 2, entry point START is entered at a primary node upon receipt of a route failure message. Step 200 calls upon system services (described in publication GC30- 3072) to determine the alternate routes, if any, between the primary and secondary nodes and to elect to terminate or allocate the sessions on the failed route to the alternate routes. Assuming that some sessions are to be switched to alternate routes, step 202 initializes a primary session switch counter PSSC to zero to prepare for sending switch messages to the secondary node. The counter is used, as will be seen, to allow the secondary and primary nodes to synchronize the number of sessions being switched from the failed route when they get out-of-step for any reason. Step 204 initializes a loop counter LOOPCTR to the number of alternate routes returned by system services for the failed route. PSSC and LOOPCTR are contained in a primary node route control block, shown in FIG. 6. The control block also contains the route with which it is associated and a link (pointer) to another control block associated with the first session on the route. Step 206 generates a switch message for the first one of the alternate routes. As shown in FIG. 7, the switch message contains the identity of the failed route, the identity of the alternate route and a list of the session identities that are being switched to the alternate route. In addition, the switch message contains a field CURCNT, which is set to a value equal to the number of sessions being switched by this switch message, and a field FINCNT. The field FINCNT is set to zero on all but the final switch message generated by the primary node for the failed route in question. Step 208 now increments the value of PSSC by the number of sessions included in the switch message. Thus, PSSC keeps an accumulated count of the total number of sessions that the primary node has switched to alternate routes. Step 209 decrements LOOPCTR. Step 210 next determines from LOOPCTR if the present alternate route is the last alternate route. Since it is not in the example at hand, step 212 sets FINCNT in the switch message to zero, as above mentioned. The switch message is transmitted to the secondary node via the alternate route at step 214 and step 206 is reexecuted to begin the generation of the next switch message. When this message is almost complete, step 210 determines that it is the last switch message in this example. As a result, step 216 is executed which sets FINCNT in the message to the total number of sessions switched that is contained in PSSC and step 218 transmits the message, thus completing the primary node's work.

The program SEC RECEIVE in FIG. 3 is entered at the secondary node in response to a switch message. There is a conventional switch timer associated with failed routes. When this timer expires, all sessions which have not been assigned to an alternate route at the secondary node are terminated. Step 300 determines if a switch timer is already active for failed route 109. As will be seen, such a timer may have already been activated by an earlier receipt of a switch message from the primary node pertaining to the route 109 failure or by notification at the secondary node of the route failure. Assuming that the timer is not yet active, step 302 activates it and step 304 initializes a counter SSSC and a flag RCVFIN, which are contained in a secondary node route control block shown in FIG. 8. Counter SSSC is the secondary node equivalent of PSSC. It is used by the secondary to accumulate the total numbers of sessions switched as indicated in switch messages received from the primary node. The flag RCVFIN is set, as will be seen, when the secondary receives a final switch message from the primary node and is used to remember this fact. As a quick aside, the program SEC_RCV_FAILURE in FIG. 4 is executed whenever the secondary node receives notification of a link failure. SEC_RCV_FAILURE performs the same steps as 300, 302 and 304 of FIG. 3. That is, if a switch timer is not yet active for a route failure, it is activated by step 402 and step 404 initializes the counter SSSC and flag RCVFIN. Returning now to step 306 of FIG. 3, in response to a switch message from the primary node, the identified sessions are switched to the identified alternate route in a straight-forward manner. This entails updating internal memory to reflect the appropriate data structure linkages and is not otherwise relevant to the invention. Step 308 next increments the present value of counter SSSC by the session switch count CURCNT contained in the switch message. Thus, SSSC accumulates a total number of sessions that is has been told to switch for the failed route. If it is assumed that the final switch message transmitted by the primary node has not been previously received, then the secondary node flat RCVFIN will be zero, causing step 310 to progress to step 312. Step 312 interrogates the value of FINCNT in the switch message to determine if this is the final message transmitted by the primary node. These steps are necessary in the system embodiment under discussion, because the switch messages from the primary node may arrive at the secondary out of sequence due to their transmittal over different alternate routes. If the message is the final primary node message, step 314 sets RCVFIN to the number of sessions switched by the primary node contained in FINCNT of the message. Step 316 next determines if the value of SSSC equals that of RCVFIN. If it does, then the secondary node has received all switch messages that the primary node has and is going to send. Accordingly, in this case, step 318 terminates all remaining sessions, if any, that still exist at the secondary node. Steps 320 and 322 deactivate the switch timer and initialize RCVFIN as part of the final cleanup processing. Thus, if a final switch message arrives at the secondary node out of order, then step 314 will set RCVFIN to the FINCNT value of the message. Steps 312 and 314 will be avoided on any subsequently arriving switch message at the secondary node, because step 310 will find RCVFIN to be nonzero. If, because of a subsequently arriving switch message or messages, the value of SSSC becomes equal (step 308) to that of RCVFIN, then step 318 will terminate all remaining sessions on the failed route.

As a final precaution, as in the prior art, the program TIMER_EXP of FIG. 5 is executed if a switch timer expires before being deactivated by step 320. Step 500 of TIMER_EXP terminates all remaining sessions on the failed route associated with the timer. Of course, other administrative cleanup work not relevant to the invention is also performed.

It is to be understood that the above described arrangements are merely illustrative of the application of principles of the invention and that other arrangements may be devised by workers skilled in the art without departing from the spirit and scope of the invention. For example, the preferred embodiment disclosed herein contemplates the generation of a switch message for each alternate route and transmission of the message via the intended alternate route. However, a skilled art worker will understand that a single message could be generated and transmitted to the second node via any available route and that the single message could identify all alternates routes and the sessions to be switched to each alternate route. It is intended that the claims cover this and equivalent embodiments.

We claim:

1. In a data communications network, a method of auditing communication connections between first and second data processing nodes, comprising the steps of
   at the first node,
   transmitting one or more switch messages to the second node to redistribute the connections on a first route between the nodes among one or more alternate routes, each switch message identifying the connections to be switched and an alternate route to which the connections are to be switched,
   indicating which switch message is the last message,
   including a representation in the last message of the total number connections that have been requested to be switched,
   at the second node,
   accumulating a count of the total number of connections on the first route requested to be switched in response to the receipt of each switch message,
   comparing the accumulated count with the total count derived from the representation of the total number of connections requested to be switched in the last message, and
   unallocating nodal resources allocated to all remaining connections on the first route if the counts are equal.

2. The method of claim 1 wherein the transmitting step further comprises
   transmitting each switch message to the second node via the alternate route for the connections identified in the switch message.

3. The method of claim 1 or claim 2 wherein the step of indicating further comprises
   storing an indication in the last message that it is the last message.

4. The method of claim 1 wherein the step of including a representation of the total switched connection count in the last message further comprises
   storing the total count in the last message.

5. The method of claim 4 further comprising the steps at the second node of
   saving the count contained in a message indicated to be last,
   if the count in the message indicated to be last does not equal the accumulated count at the second node, continuing to accumulate a total count of the number of connections requested to be switched in response to subsequent switch messages received after the message indicated to be last, and
   unallocating nodal resources allocated to any remaining connections on the first route whenever the saved count and the accumulated count become equal.

6. The method of claim 5 further comprising the steps at the second node of
   activating a timer upon receipt of a signal indicating a failure of the first route, and unallocating nodal resources allocated to connections remaining on the first route in response to the expiration of the timer irrespective of the number of connections switched as a result of switch messages.

7. In a data communications network, a method of auditing communication connections between first and second data processing nodes, comprising the steps of at the first node,
transmitting one or more switch messages to the second node to redistribute the connections on a first route between the nodes among one or more alternate routes, each switch message identifying the connections to be switched and an alternate route to which the connections are to be switched,
storing an indication in the last message that it is the last message,
storing a count in the last message of the total number of connections that have been requested to be switched, at the second node,
accumulating a count of the total number of connections on the first route requested to be switched in response to the receipt of each switch message,
comparing the accumulated count with the total count in the last message in response to each switch message; and
unallocating nodal resources allocated to all remaining connections on the first route if the counts are equal.

8. In a data communications network comprising a plurality of data processing nodes and communication links interconnecting the nodes, means for auditing communication connections on a network route between first and second nodes of the network, comprising at the first node,
means for transmitting one or more switch messages to the second node to redistribute the connections on a first route between the nodes among one or more alternate routes, each switch message identifying the connections to be switched as a result of the message and an alternate route to which the connections are to be switched,
means for setting an indication in the last switch message that it is the last message,
means for storing a count in the last message of the total number of connections that have been requested to be switched, at the second node,
means for accumulating a count of the total number of connections on the first route required to be switched in response to the receipt of each switch message,
means for comparing the accumulated count with the total count contained in a message indicated to be a last message, and
means for unallocating nodal resources allocated to all remaining connections on the first route if the counts are equal.

9. The network of claim 8 further comprising
at the second node,
means for saving the count contained in a message indicated to be last
if the count in the message indicated to be last does not equal the accumulated count at the second node, said accumulating means being further operative for accumulating a total count of the number of connections requested to be switched in response to subsequent switch messages received after the message indicated to be last, and
means for unallocating nodal resources allocated to the remaining connections on the first route whenever the counts become equal.

10. The network of claim 9 further comprising at the second node
means for activating a timer upon receipt of a signal indicating a failure of the first route, and
means for unallocating nodal resources allocated to connections remaining on the first route in response to the expiration of the timer irrespective of the number of connections switched as a result of switch messages.

* * * * *